UNITED STATES PATENT OFFICE.

JOHN ROBERTSON, OF POTTSVILLE, PENNSYLVANIA.

PREPARATION OF BREAD.

SPECIFICATION forming part of Letters Patent No. 379,727, dated March 20, 1888.

Application filed March 19, 1887. Serial No. 231,604. (No specimens.)

*To all whom it may concern:*

Be it known that I, JOHN ROBERTSON, a citizen of the United States, residing at Pottsville, in the county of Schuylkill and State of Pennsylvania, have invented certain new and useful Improvements in the Making of Bread; and I do hereby declare the following to be a full, clear, and exact description of the invention, such as will enable others skilled in the art to which it appertains to make and use the same.

The process of making bread, as heretofore used, consists simply in the mixing of flour or meal with water or milk, adding a suitable leaven, with salt or sugar or similar ingredients, at the pleasure of the maker, and then working or kneading the mass into loaves and baking them. The value of bread so made as a food varies according to the quality of the ingredients used and the proper manner of combining and manipulating them.

My object is to produce a bread that will have a higher food value and that will have nutritive and medicinal properties that are wanting and do not exist in ordinary bread, and I attain my object by use of the process which follows: I take of wheat-grain two pounds; oat-grain, two pounds; rye-grain, one pound, and barley-grain one pound, all being broken or crushed and mixed together in any suitable vessel. On this mass of grain I pour four quarts of fresh skimmed milk heated to the boiling-point, and allow all to stand for two hours. I then add one quart more of the boiling skimmed milk, stir the mass, and allow it to stand one hour longer. The whole mass I then press or strain through muslin. Afterward I add one more quart of the boiling milk to the grain and press and strain it through the muslin. I thus have a quantity of liquid in which the essence and nutritive properties of the grain are combined, and containing no portion of the undigestible and irritating properties of the grain. To this liquid I add three eggs, well beaten, and a suitable quantity of leaven. With the addition of wheat-flour, salt, &c., I now proceed to make up my bread in the ordinary manner, the result being a product which is of the highest value as food, easily digested and assimilated, and a most grateful and strengthening article of diet for dyspeptics or those persons having sensitive or diseased digestive organs.

I do not claim as original the process of mixing together the liquid, salt, and flour, and forming the mass into loaves, nor do I claim the use of milk in bread-making as new.

I use milk as a menstruum, to dissolve the grain and extract its essences and nutritive properties, and I use it at the boiling-point because I thus obtain the best results and the most perfect combination of the extracts of the grain with the milk.

The bread produced by my process, while being palatable and nourishing to all persons, has been fully proved to be of the highest value as a medicinal and curative agent for certain diseases of the digestive organs.

What I claim is—

The process of extracting in solution the essences and nutritive properties of wheat, oat, rye, and barley grain in certain proportions by use of fresh skimmed milk heated to the boiling-point, and combining this solution with eggs, leaven, flour or meal, salt, &c., and working and forming the resultant mass into loaves and baking them, producing a bread having medicinal or curative properties for disordered digestion, as herein described and set forth.

JOHN ROBERTSON.

Witnesses:
H. K. WESTON,
LILLIE ROBERTSON.